3,216,940
POLYMERIC COMPOSITIONS AND LUBRICANTS CONTAINING THEM
Frank A. Stuart, Orinda, William T. Stewart, El Cerrito, and Warren Lowe and Frank W. Kavanagh, Berkeley, Calif., assignors to California Research Corporation, San Francisco, Calif., a corporation of Delaware
No Drawing. Filed Dec. 18, 1962, Ser. No. 245,385
2 Claims. (Cl. 252—51.5)

This application is a continuation-in-part of Stuart, Stewart, Lowe and Kavanagh patent applications Serial Nos. 38,698 and 38,750, filed June 27, 1960; which in turn are both continuations-in-part of their patent application Serial No. 821,686, filed June 22, 1959 (now U.S. Patent No. 3,073,807); which in turn is a division of their patent application Serial No. 729,560, filed April 21, 1958 (now U.S. Patent No. 2,892,783); which in turn is a continuation-in-part of their patent application Serial No. 574,635, filed March 29, 1956; which in turn is a continuation-in-part of their patent applications Serial Nos. 400,757, 400,758 and 400,759, filed December 28, 1953; which in turn are continuations-in-part of their patent application Serial No. 340,378, filed March 4, 1953.

This application is also a continuation-in-part of Lowe, Stuart, Stewart and Kavanagh patent application Serial No. 645,887, filed March 14, 1957; and Stewart, Lowe, Stuart and Kavanagh patent application Serial No. 645,888, filed March 14, 1957; and Lowe, Stuart, Stewart and Kavanagh patent application Serial No. 646,524, filed March 18, 1957.

All of the above-mentioned patent applications, with the exception of applications Serial Nos. 821,686, now U.S. Patent No. 3,073,807, issued January 15, 1963, and 729,560, now U.S. Patent No. 2,892,783, issued June 30, 1959, are now abandoned.

This invention is directed to a novel polymeric composition. More particularly, the invention is concerned with a superior new polymeric composition useful as an ashless detergent for internal combusion engine lubricating oils and as a dispersant for engine fuels and hydrocarbon compositions in general.

Lubricant compositions commonly contain detergents to help prevent the deposit of solid materials on engine surfaces coming in contact with the lubricant composition. Such deposits tend to interfere with normal circulation of the lubricant composition and act as abrasives causing exessive wear of engine parts. Engine fuels also often require dispersants to prevent sludge deposits.

A substantial proportion of modern engine deposits is attributable to the additives commonly present in lubricant and fuel compositions, particularly in the case of metal-containing additives. As a lubricant or fuel composition is consumed by combustion on cylinder walls and the like in the engine, such metal-containing additives may form an ash which deposits out on the engine surfaces coming into contact with the composition.

In accordance with the present invention a superior new ashless detergent polymeric composition has been discovered, namely, the oil-soluble copolymer which comprises (A) at least one oil-solubilizing monomer having a single polymerizable ethylenic group and containing a monovalent hydrocarbon group of from 4 to 30 aliphatic carbon atoms, (B) at least one oxirane substituted monomer having a single polymerizable ethylenic group and an epoxy group, the epoxy ring being reacted with an aliphatic polyamine containing at least one nontertiary amino group and the molar ratio of the oxirane portion to amino compound being approximately 1:1 and (C) polyglycol monomeric compounds having a polymerizable ethylenic linkage and a polyglycol group containing at least 5 alkylene oxide units in which each alkylene oxide unit has from 2 to 7 carbon atoms, said copolymer containing from about 40 to 96% by weight of hydrocarbon oil-solubilizing groups from said (A) component, from about 0.05 to 8.0% by weight of nitrogen, from about 4 to about 60% by weight of polyglycol groups in the (C) component and having a total molecular weight of at least about 2,000.

The polymeric composition of this invention as described above is unusually effective in the prevention of engine deposits. The detergent copolymer of the composition contains no metal component and is therefore substantially free of any ash-forming tendencies. This is a particular advantage over conventional detergent polymer compositions based on organic metal salts.

The ashless detergent polymeric composition of the present invention is also outstandingly effective in providing detergency over a wide temperature range. It gives excellent performance in relatively low temperature operations such as that encountered in gasoline internal combustion engines operating under "stop and go" city driving conditions. It also functions remarkably well in engine operation involving higher temperatures such as those encountered in diesel engines.

The essential characteristics of the polymeric detergent of the present composition as described above is the predominantly aliphatic hydrocarbon macromolecule having epoxy groups reacted with a single nontertiary amino group of an amino compound to yield amino-alcohol groups in combination with polyglycol groups. The aliphatic hydrocarbon portion provides the oil-solubility to the copolymer and the amino-alcohol and polyglycol portions supply the surface active detergent polarity to the polymer. These oil-solubilizing and polar portions combine in the macromolecule to give the detergent properties as noted above.

In the present description the term "macromolecule" is employed in its commonly accepted sense and refers to large molecules such as those synthesized by polymerization and condensation reactions as well as those occurring in nature, for example, the polysaccharides and the polypeptides illustrated by cellulose and proteins. Most suitably, the predominantly aliphatic hydrocarbon macromolecule detergent additive of the invention is a polymeric type compound. Such compounds may have the amino-alcohol portion prepared by first introducing epoxy groups or attaching oxirane groups to ethylene, propylene or isobutylene polymers by means of reactive centers which provide linking groups. Following this, the epoxy groups are reacted with the amino compounds. Likewise, the polyglycol portions may be provided by attaching polyglycol chains through suitable linking groups which may be derived from reactive centers previously introduced into the macromolecule. More satisfactorily for present purposes, however, such polymeric compounds are obtained by copolymerizing the appropriate oil-solubilizing monomers, polyglycol monomers and epoxy substituted monomers as hereinafter described, followed by reaction with the amino compound to give the oil-soluble polymer having the essential polar acting amino-alcohol groups.

The oil-solubilizing monomer portion of the polymeric additives of this invention can be any compound having a single polymerizable ethylenic group together with an oil-solubilizing hydrocarbon group of from 4 to 30 aliphatic carbon atoms. Such monomers are essentially characterized by their ability to copolymerize through said ethylenic group with monomers containing the intermediate epoxy groups or the final amino-alcohol group and the intermediate or the final polyglycol group referred to above. Alternatively, the oil-solubilizing aliphatic radical can be introduced into the copolymer of the composition according to this invention following the polymerization. This aliphatic radical whether present in the original monomer or introduced into the copolymer imparts oil-solubility to the polymer. It is preferably a branched or straight chain alkyl radical or a cycloalkyl radical such as butyl, isobutyl, n-pentyl, decyl, dodecyl, cyclohexyl, etc., or an alkenyl radical such as oleyl, ricinoleyl or the like wherein the ethylenic double bond has substantially no copolymerizing tendency.

Oil-solubilizing monomers of this general character are well known in the art and are frequently employed as the oil-solubilizing portion of copolymers which are added to lubricating oils to improve the viscosity index and pour point characteristics thereof. They include such materials as olefins and ethylenically unsaturated ethers and esters and the like.

Representative oil-solubilizing olefins and monomeric compounds of the aforementioned types which can be employed to form the copolymeric additives of the present invention include the following:

OLEFINS

Ethylene
Propylene
Butene-1
Isobutene
Pentene-1
Hexene-1
2-ethylhexene-1
Di- and triisobutylene
Tripropylene
Dodecene-1
Hexadecene-1
Cyclohexene
Octadecene-1
4-octylcyclohexene-1
3-phenylhexadecene-1
p-Octylstyrene
Vinylcyclohexane
p-Tertiarybutylstyrene

ETHERS

Vinyl n-butyl ether
Vinyl 2-ethylhexyl ether
Allyl n-butyl ether
Allyl isobutyl ether
Allyl cyclohexyl ether
Allyl 4,4,8,8-tetramethyl docosyl ether
Methallyl n-hexyl ether
Methallyl n-decyl ether
Methallyl 2-ethylhexyl ether
Methallyl octadecyl ether
Propenyl 2-ethylhexyl ether
Crotyl n-octyl ether
Isopropenyl dodecyl ether
1-decenyl butyl ether
1-eicosenyl decyl ether
Vinyl p-octylphenyl ether
Methallyl p-tert. butylphenyl ether
1-decenyl p-cetylphenyl ether
1-decenyl 2-phenylbutyl ether

ESTERS

Vinyl caproate
Vinyl palmitate
Vinyl oleate
Allyl caprylate
Allyl laurate
Allyl oleate
Allyl palmitate
Allyl stearate
Allyl 2-ethylhexanoate
Allyl ricinoleate
Allyl esters of babassu acids
Allyl esters of lard acids
Allyl naphthenate
Methallyl caproate
Methallyl napthenate
Methallyl ricinoleate
Methallyl p-octylbenzoate
Methallyl oleate
Methallyl cyclohexane carboxylate
Methallyl palmitate
Crotyl oleate
Crotyl naphthenate
α-Methylcrotyl palmitate
1-propenyl naphthenate
1-propenyl elaidate
Dodecyl acrylate
Hexadecyl methacrylate
Isobutyl α-decylacrylate
Vinyl p-n-octyl benzoate
Allyl 3,5-diisobutyl benzoate
Cyclohexyl methacrylate
Cyclohexyl 2-dodecenoate
Decyl vinyl acetate
Isooctyl α-chloroacrylate
p-Isoamylphenyl 2-hexadecenoate
4-p-Tolylbutyl 2-octadecenoate
Undecyl cinnamate
Methylcyclohexyl 2-ethyl-2-hexenoate
5-ethyldocosyl crotonate
Octadecyl isocrotonate
n-Butyl 2-eicosenoate
p-Tert. amylphenyl octadecyl maleate
p-Hexadecylphenyl 2-ethylhexyl maleate
o-Tolyl 2-octadecylcyclohexyl maleate
Butyl methacrylate
o-Nonylphenyl-hexadecyl maleate
Dihexadecyl maleate
Di-methylcyclohexyl maleate
Mono-2-ethylhexyl maleate
Di-2-ethylhexyl maleate
Di-dodecyl maleate
Di-dodecyl fumarate
Di-dodecyl mesaconate
Di-dodecyl citraconate
o-Tolyl octadecyl itaconate
Mono-hexadecyl itaconate
Isopropenyl palmitoleate
1-decenyl laurate
1-hexadecenyl myristate Although any of the oil-solubilizing compounds described above will give effective copolymer compositions for lubricant compositions in accordance with the present invention, alkyl esters of α,β-unsaturated monocarboxylic acids of from 3 to 5 carbon atoms having alkyl groups of at least 4 carbon atoms and, more particularly, of from 8 to 30 carbon atoms are most preferred, both for availability and effectiveness of copolymers prepared from them. Representative acids of this type are the acrylic, methacrylic, crotonic, tiglic, angelic, α-ethylacrylic, α-methylcrotonic, α-ethylcrotonic, β-ethylcrotonic, β-propylcrotonic, and hydrosorbic acids and the like. Even more desirable are the alkyl esters of acrylic and methacrylic acids and mixtures thereof containing an average of from 10 to 20 carbon atoms in the alkyl groups, since they are found to provide highly superior polymers for the lubricant compositions of the invention and are obtainable in commercial quantities.

The epoxy substituted monomeric components of the additives of this invention as already mentioned are preferably derivatives of a polymerizable oxirane compound which is reacted with an amino compound containing at least one nontertiary amino group. Suitable epoxy substituted monomers include the olefins, ethers and esters of the types mentioned above in connection with the oil-solubilizing monomers, the essential difference being that they are characterized by the presence of an epoxy group in addition to the polymerizable ethylenic group.

For present purposes the preferred epoxy compounds are the above-mentioned olefins, ethers and esters as illustrated by butadiene monoxide allyl glycidyl ether, vinyl glycidyl ether, glycidyl methacrylate, diglycidyl maleate and the like. Such epoxy compounds when reacted with a single nontertiary amino group of an amino compound provide monomers having the following structure in addition to the polymerizable ethylenic group:

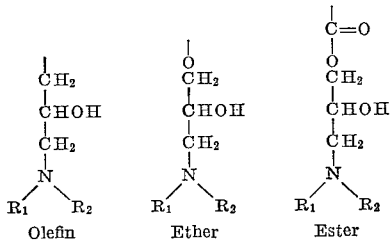

in which $R_1$ is hydroxyalkyl, aminoalkyl or polyalkylene polyamine in structure and $R_2$ is hydrogen or a group similar to group $R_1$. In the formulae $R_1$ and $R_2$ may also be present in the form of a single aromatic or cycloaliphatic ring as in the case of N-amino propyl morpholine, N-2-amino ethyl piperazine, etc.

Presently preferred are the reactants of glycidyl esters of unsaturated monocarboxylic acids of 3 to 5 carbon atoms and aliphatic polyamines such as alkylene diamines and polyalkylene polyamines in which the alkylene groups contain from 2 to 4 carbon atoms each and the polyalkylene polyamines contain from 2 to 8 alkylene amine units. The amino groups of the polyamines may have nitrogen atoms substituted by alkyl radicals of from 1 to 4 carbon atoms, so long as there is at least one primary or secondary amino group present for reacting with the epoxy ring of the glycidyl group. Representative amino compounds which can be reacted with the epoxy ring or the oxirane group as described above include:

ALIPHATIC AMINES

Ethylene diamine
N,N-dimethyl propylene diamine
Aminoethyl ethanolamine
N-oleamide of hydroxyethyl ethylene diamine
Diethylene triamine
Tetraethylene pentamine
N-aminoethyl stearyl imidazoline

AROMATIC AMINES

N-2-aminoethyl-piperazine
N-aminopropyl-morpholine
Phenylenediamine

Briefly described, the polyglycol groups of the predominantly aliphatic hydrocarbon macromolecule additives according to the invention are essentially characterized by the presence of at least 5 alkylene oxide units each with alkylene groups of from 2 to 7 carbon atoms each as previously mentioned. The end of the polyglycol group other than that linked to form the macromolecule may be hydroxyl or it may have other terminal groups, including polar groups. Polymers containing such polyglycol groups have already been described in great detail in our copending patent U.S. application Serial No. 821,686, filed June 22, 1959, now U.S. Patent No. 3,073,807, issued January 15, 1963, which in turn is a division of U.S. application Serial No. 729,560, filed April 21, 1958, and issued on June 30, 1959, as U.S. Patent No. 2,892,783.

The polyalkylene glycols of the polyglycol monomeric compounds noted previously as the (C) components of the particular polymeric additives of the invention have the above-described essential characteristics. Poly-1,2-alkylene glycols and their alkyl ethers having molecular weights between 220 and 30,000 are preferred. Such glycols may be obtained by polymerizing 1,2-alkylene oxides or mixtures thereof in the presence of a catalyst and a suitable initiator for the reaction such as water, monohydric alcohol in the case of the alkyl ethers, mercaptans and the like. The preparation of polyglycol compounds of this type has been fully described heretofore in U.S. Patents 2,448,664 and 2,457,139, for example, and, therefore, requires no detailed discussion here.

For present purposes, the most suitable poly-1,2-alkylene glycol groups are those derived from ethylene oxide or from 1,2-propylene oxide or mixtures thereof and their alkyl ethers of 1 to 18 carbon atoms per alkyl group which have molecular weights or average molecular weights between about 220 and 30,000, preferably between about 400 and 10,000. These polyalkylene glycol groups are found to provide the most effective detergent and wear inhibiting compositions.

The following polyalkylene glycol groups containing from 2 to 7 carbon atoms in each alkylene group are illustrative of the types described above:

L—(CH$_2$—CH$_2$—O)$_5$—OC$_2$H$_5$
L—(CH$_2$—CH$_2$—O)$_7$—CH$_2$CH$_2$N(C$_2$H$_5$)$_2$

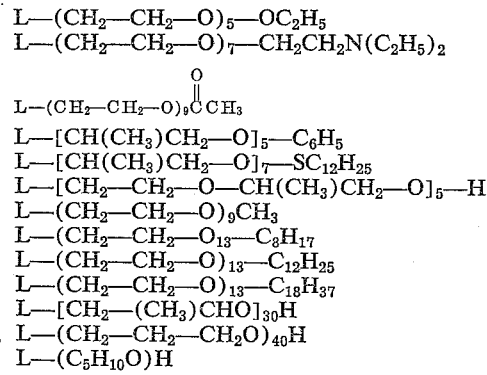

L—[CH(CH$_3$)CH$_2$—O]$_5$—C$_6$H$_5$
L—[CH(CH$_3$)CH$_2$—O]$_7$—SC$_{12}$H$_{25}$
L—[CH$_2$—CH$_2$—O—CH(CH$_3$)CH$_2$—O]$_5$—H
L—(CH$_2$—CH$_2$—O)$_9$CH$_3$
L—(CH$_2$—CH$_2$—O)$_{13}$—C$_8$H$_{17}$
L—(CH$_2$—CH$_2$—O)$_{13}$—C$_{12}$H$_{25}$
L—(CH$_2$—CH$_2$—O)$_{13}$—C$_{18}$H$_{37}$
L—[CH$_2$—(CH$_3$)CHO]$_{30}$H
L—(CH$_2$—CH$_2$—CH$_2$O)$_{40}$H
L—(C$_5$H$_{10}$O)H

Polyethylene glycol mixtures having average molecular weights of 220, 400, 1000, 1540, 2000 or 10,000 and monoalkyl ethers thereof.

Poly-1,2-propylene glycol mixtures having average molecular weights of 425, 1025 or 10,000 and monoalkyl ethers thereof.

In the above polyalkylene glycol groups L is the linking group which connects the polyglycol portion to the hydrocarbon portion of the macromolecule in the polyglycol additive.

Illustrative polyvalent linking groups include alkylene groups such as methylene —CH$_2$—, oxy-O—

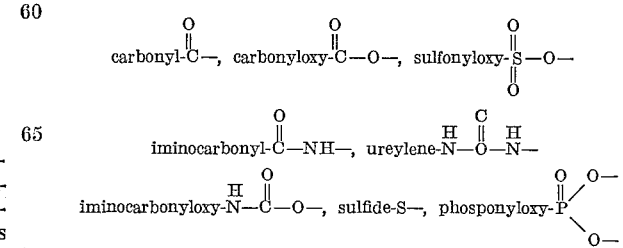

and amino —NH— groups and combinations thereof with alkylene groups of from 1 to 7 carbon atoms each.

The predominantly aliphatic hydrocarbon macromolecules having polyglycol groups in accordance with the invention as already mentioned are most suitably polymeric additives. Although the polyglycol groups are operative without regard to any specific mode of attachment to the hydrocarbon portion of the additive, particularly suitable additives are obtained by copolymerization of an oil-solubilizing monomer (A) and an amino-alcohol monomer (B) with a polyglycol (C) monomer having a polymerizable ethylenic linkage and a polyalkylene glycol group of the above-described type. More particularly, suitable polyglycol monomers are characterized by a hydrocarbon portion having a polymerizable ethylenic linkage which is connected to the polyglycol portion by linking group of the aforementioned description.

Illustrative polyglycol monomeric compounds are the monoesters of $\alpha,\beta$-unsaturated monocarboxylic acids of 3 to 15 carbon atoms and $\alpha,\beta$-unsaturated, $\alpha,\beta$-dicarboxylic acids of 4 to 12 carbon atoms. The preferred monocarboxylic acids are those containing from 3 to 8 carbon atoms and more particularly acrylic and methacrylic acids. The preferred dicarboxylic acids contain a total of from about 4 to 8 carbon atoms with maleic acid being particularly preferred.

Also included as suitable polyglycol monomers are the polyglycol amides of unsaturated monocarboxylic acids and dicarboxylic acids of the above described types. Such monomers are obtained when the amide of an unsaturated acid is used as an initiator in the polymerization of the 1,2-alkylene oxides or mixtures thereof as mentioned above. The methacrylamide initiated polyalkylene-glycol is an example of these monomers.

The vinyl and allyl monoethers of polyglycols are also satisfactory polyglycol monomers. Such ethers are obtained by the reaction of acetylene with pre-formed polyglycol or by the use of unsaturated alcohols such as allyl alcohol as initiators in the polymerization of 1,2-alkylene oxides or mixtures thereof. Examples of these monomers are allyl alcohol initiated polyethylene glycol and methallyl alcohol initiated polyethylene glycol.

Other types of monomers with other kinds of linking groups such as the phosphonyl and sulfonyl groups referred to above are also satisfactory for the polyglycol monomers.

In the preferred copolymeric type polyglycol macromolecules of the invention, the polyglycol ester monomers are particularly suitable. These monomers have a general structural formula $$R_1-\overset{R_2}{\underset{|}{C}}=\overset{R_3}{\underset{|}{C}}-\overset{O}{\underset{\|}{C}}-O-(-R_5-O)_n-R_6$$

where $R_1$, $R_2$ and $R_3$ are hydrogen atoms or $C_1$-$C_4$ alkyl radicals, the $R_5$'s are 1,2-alkylene radicals of 2 to 7 carbon atoms, $n$ is an integer greater than 5, and $R_6$ is a hydrogen atom or a substituted or unsubstituted hydrocarbon group, the substituent groups here contemplated being the polar groups.

$$-COOH, -\overset{O}{\underset{\|}{C}}-OR_7, -OR_7, -NO_2, -SR_7 \text{ } O\overset{O}{\underset{\|}{C}}R_7, NR_7-R_8, \text{ or } -\overset{O}{\underset{\|}{C}}-$$

where the $R_7$'s and $R_8$'s are hydrogen atoms or hydrocarbon groups. For present purposes, however, a more preferred group of polyglycol ester monomers, previously referred to as (B) monomer components, is made up of those compounds wherein, in the above structural formula, $R_1$ and $R_2$ represent hydrogen atoms, $R_3$ represents hydrogen or a methyl group, the $R_5$'s are ethylene or propylene groups, and $R_6$ is hydrogen or an alkyl group of from 1 to 18 carbon atoms.

In preparing the polymers of the invention it is only necessary that conditions be chosen which ensure polymerization and the formation of polymers having the requisite oil-solubility and polarity. The oil-solubilizing (A) monomers vary somewhat in their solubilizing characteristics. Thus, in some cases it is possible to obtain polymers which are soluble in oil by employing oil-solubilizing (A) and glycidyl-amino compound (B) monomer and polyglycol (C) monomer ratios as low as 1:1:1.

In other cases it is advantageous to raise the ratio of (A) to (B) to (C) to a much higher value, for example, about 100:1:1 in order to obtain a polymer product having optimum oil-solubility and polarity characteristics. As a general rule, however, polymers having excellent dispersant characteristics together with the requisite oil-solubility (which should be at least 0.5 and is preferably as great as 10% by weight of the lubricant composition) can be prepared by employing oil-solubilizing (A) monomers to polar (B) and (C) monomers in ratios of from about 5:1:1 to 100:1:1 and such a range is preferably employed where possible.

Because of the variations in the types of oil-solubilizing (A) monomerds and the polar (B) and (C) monomers as mentioned above, it is preferable to describe the overall composition of the polymers of this invention on the basis of amino nitrogen content of the (B) component and the total weight percent of the (C) component. Suitable detergents or dispersants are obtained when the nitrogen content is from 0.05 to 8.0% by weight of the polymer. Preferably, the polymers contain from 0.1 to 5.0% by weight.

In general, satisfactory oil-solubility, antiwear and detergency properties are obtained with polymers wherein the (A), or oil-solubilizing component constitutes from about 40 to 96 weight percent of the overall polymer composition, with the (C), or polar polyglycol monomers representing a total of from 60 to 4 weight percent of the polymer composition, there being in all cases at least one and usually several monomer units of said (C) polyglycol monomer components in the copolymer. By a careful program of exploratory research, supported by engine testing data, preferred ranges can be established within the aforesaid ranges for particular polymers and classes of polymers coming within the scope of this invention. Thus, with copolymers of (A), a higher alkyl methacrylate (e.g., lauryl methacrylate), (B) dimethyl amino propylamine-glycidyl methacrylate, and (C) an acrylate or methacrylate of a polyethylene glycol or a polypropylene glycol, or a monoalkyl ether of said glycols, or mixture of said glycols or glycol ethers, or a polyglycol monoether, where the glycols are of the moleccular weights previously specified for these compounds, there preferably is employed from 80 to 96 weight percent of the oil-solubilizing (A) component.

Although effective copolymers according to the invention are obtained with proportions of oil-solubilizing (A) monomer units and polar (B) and (C) monomer units within the aforementioned ranges, it has been noted that in a preferred application of the copolymeric lubricating oil detergent additives of the present invention in mineral lubricating oil, a certain optimum relationship appears to exist between the total number of solubilizing aliphatic carbon atoms and the total number of polar groups within the molecule. This optimum relationship which is termed "polar balance" for convenience, is expressed by the formula $$PB = \frac{\Sigma(N_p \times P)}{N_s}$$

in which $PB$=polar balance, $N_p$=number of a certain polar group, $P$=polarity constant for the polar group, $N_s$=number of solubilizing aliphatic carbon atoms.

The polarity constant for free carboxyl polar groups (—COOH) is 100. For hydroxyl and non-tertiary amino polar groups, the polarity constant is 50. For alkylene oxide groups (—RO—, where R is an alkylene group, preferably ethylene or propylene) and tertiary amino groups, the polarity constant is 15. The solubilizing aliphatic carbon atoms to be considered are the following:

$$CH_3-, \text{ } -CH_2-, \text{ } -\overset{|}{\underset{|}{C}}H, \text{ } -\overset{|}{\underset{|}{C}}-$$

and excluding aromatic ring carbon atoms and the carbon atoms of carbonyl groups.

The polar balance of a given copolymer according to the above formula is equal to the sum of the number of each type of polar group multiplied by its polarity constant, said sum being then divided by the number of solubilizing aliphatic carbon atoms. For best performance the polar balance is approximately 1. However, very effective copolymeric lubricating oil detergent additives may have polar balances in the range from 0.15 to 3.00.

The macromolecules employed in the compositions of this invention can be prepared by any one of several methods as known in the art. As indicated above, the oil-solubilizing groups, the amino-alcohol groups and polyglycol groups, as well as optional polar groups of the macromolecules are attached in various ways. In the case of the essential amino-alcohol groups there are three general methods of attachment. (1) The amino-alcohol group may be incorporated by reacting a preformed polymer containing reactive centers such as free carboxyl groups with glycidol following which the epoxy group of the glycidyl group is reacted with the amino compound. (2) The amino-alcohol group may also be introduced as the polymerizable monomer prepared by (a) reacting glycidol with a reactive monomer such as methacrylic acid which is then polymerized to give a glycidyl methacrylate containing copolymer in which the epoxy groups may be reacted with the amino compound or (b) reacting glycidol with a reactive monomer such as methacrylic acid followed immediately by reaction of the epoxy group of the glycidyl group with the amino compound to give the amino-alcohol group monomer which is then copolymerized with the oil-solubilizing (A) and polyglycol (C) polar monomers. (3) The amino-alcohol group may be incorporated into a preformed polymer by reacting an epoxy amino compound reaction product of the amino-alcohol group type mentioned above with reactive centers as described in (1). In this case the epoxy portion of the glycidyl group has already been reacted with the amino compound. Thus, it may be seen that one may polymerize a mixture of the desired monomer components to form the polymer or the copolymers may be obtained by starting with suitable precursor compounds with the desired monomer units and treating the intermediate to obtain the desired final product.

In all of the above general methods, when the oxirane ring is reacted with the amino compound, a large excess of amine is employed to prevent cross linking. When the oxirane ring is opened with an amino compound, a new amine and a free hydroxyl group are formed as follows:

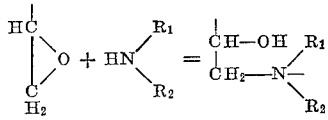

When $R_1$ or $R_2$ is hydrogen, these hydrogen atoms, as well as those of any other nontertiary amino group, are capable of opening a second oxirane ring. This may result in cross-linked, resinous polymers. For example, in the case where the amino group is added to the monomer before polymerization (as in method 2b above) there would result a di-ethylenically unsaturated monomer which would necessarily cross link during polymerization. To avoid these undesirable reactions, and ensure linear oil-soluble polymers, a large excess of amine is employed. This forces the desired reactions. Excess amine is readily removed by distillation, precipitation or any other conventional separation process. Such excesses are usually at least three- to five-fold and range as high as 10 to 30 times the theoretical amount required to react one mole of amino-compound with one mole of epoxy compound, particularly in the case of the more readily cross-linked primary amino and polyamino compounds.

In the case of the essential polyglycol groups there are three general methods of attachment (1) The polyglycol group may be incorporated by reaction with a preformed polymer containing reactive centers such as free carboxyl groups. (2) The polyglycol group may also be introduced as a polymerizable monomer prepared by (a) reacting a polyglycol compound with a reactive monomer such as methacrylyl chloride or methacrylic acid, or (b) initiating alkylene oxide polymerization with a suitable compound containing a polymerizable double bond such as allyl alcohol. (3) The polyglycol group may also be incorporated in a similar fashion by initiating the alkylene oxide polymerization with a preformed polymer containing reactive centers as described in (1). In the case of the oil-solubilizing groups and the optional polar groups the methods of attachment would be the same except for the alkylene oxide polymerization.

Thus, one may polymerize a mixture of the desired monomer components to form the desired polymer. Satisfactory copolymers are also obtained, however, by starting with suitable precursor compounds, with the desired monomer units then being formed by the appropriate treatment of the resulting polymeric intermediate product. Thus, one may first copolymerize a given oil-solubilizing compound such as an alkyl methacrylate with a suitable acid component such as methacrylic acid or maleic anhydride and some other polar component such as pyrrolidone; the resulting polymer is then reacted with a polyalkylene glycol whereby a portion or all of the free —COOH groups in the polymer intermediate become monoester-linked to the polyalkylene glycol.

The general principles of preparation outlined above are applicable to all types of macromolecules according to the invention. Other possible variations in the nature of the reactants and in the selection of a suitable reaction path would obviously suggest themselves to those skilled in the art.

When the polymeric additive of this invention, or a suitable polymeric intermediate, is to be prepared by reaction of monomeric components, said polymers can be prepared by conventional bulk, solution or emulsion methods in the presence of an addition polymerization initiator. Preferably, however, the copolymerization is effected in an inert organic solvent such as benzene, toluene, xylene or petroleum naphtha in the presence of a free radical-liberating type of initiator such as a peroxy compound, for example, benzoyl peroxide, acetyl peroxide, tert. butyl hydroperoxide, di-tert. butyl peroxide, di-benzoyl peroxide, or di-tert. amyl peroxide, or an azo initiator such as 1,1'-azodicyclohexane, carbonitrile, or $\alpha,\alpha'$-azodiisobutyronitrile. The catalyst, or polymerization initiator, can be employed in an amount of from about 0.01 to 10%, with a preferred range being from 0.01 to 2%. If desired, the catalyst can be added in increments as the reaction proceeds. Likewise, additional portions of the solvent can also be added from time to time in order to maintain the solution in a homogeneous condition. The temperature of copolymerization varies from about 100 to 300° F. with the optimum temperature for any given preparation depending on the nature of the solvent, the concentration of monomers present in the solvent, the catalyst and the duration of the reaction. Much the same conditions are employed when the copolymerization is effected in bulk rather than in the presence of an inert solvent.

The additives of this invention have apparent molecular weights as determined by standard light scattering methods and viscosity measurements of at least 2,000 and preferably at least 50,000. For practical purposes molecular weights of from 100,000 to 1,000,000 are most suitable from the standpoint of viscosity and other physical characteristics of the polymeric additives.

The following examples are illustrative of typical methods for preparing the alcohol-amino compound and the polyglycol polymeric type additives according to the invention.

*Example 1*

This example illustrates the preparation of a copolymer intermediate of mixed dodecyl and octadecyl methacrylates, polyethylene glycol (1800 av. mol. wt.) monododecyl ether methacrylate and glycidyl methacrylate.

A 2-liter flask fitted with stirrer, reflux condenser and dropping funnel is charged with 920 g. (2.9 moles) of alkyl methacrylate in which the alkyl groups are a mixture of 60% by weight dodecyl and 40% by weight octadecyl groups, 118 g. (0.059 mole) polyethylene glycol (1800 av. mol. wt.) monododecyl ether methacrylate, 8.5 g. (0.06 mole) glycidyl methacrylate and 590 g. benzene. The flask is purged with nitrogen. The charge mixture is heated to reflux and is polymerized for about 7 hours by the addition of a 2% solution of bis-azoisobutyronitrile in benzene as catalyst. The catalyst is added at a rate of 3.8 ml. every 15 minutes.

The polymer formed in the above reaction is precipitated from the reaction mix by the addition of a 4-fold volume of acetone. A determination of the hexane insolubles and of the oxirane oxygen shows that the conversion of polyethylene glycol methacrylate and of glycidyl methacrylate is approximately 89%. Thus, the three monomer species are present in the polymer in the molar ratio of 50:1:1.

*Example 2*

This example shows the conversion of the alkyl methacrylate, glycidyl methacrylate and polyethylene glycol methacrylate copolymer intermediate of the above preparation to the corresponding glycidyl amino compound by reaction with tetraethylene pentamine.

In a 2-liter flask as described above, 150 g. of the copolymer of Example 1 is dissolved in 300 ml. of xylene. This solution is refluxed for 6 hours with 60 g. of tetraethylene pentamine. The polymer product is precipitated from the xylene solution three times with methanol. A nitrogen determination shows 0.45% nitrogen which corresponds to a copolymer having the molar composition of alkyl methacrylate:polyethylene glycol methacrylate: glycidyl methacrylate-tetraethylene pentamine condensation product of 50:1:1.07.

Other polymers illustrative of the compositions of the invention are also prepared according to the general procedures outlined in the above discussion and examples. These polymers are described with respect to the particular monomers and mole ratios employed, along with pertinent performance data, in the tables which appear below.

In general, excellent detergent and anti-wear properties can be imparted to lubricating oils by dissolving therein a quantity of from about 0.1 to 10% by weight of the polymers of the type described above, although a preferred range is from about 1 to 5% by weight. On the other hand, since the polymers of this invention are unusually compatible with mineral and other lubricating oils in substantially all proportions, as much as 75% of the present polymeric additives can be dissolved in a suitable lubricating oil for the purpose of preparing a concentrate capable of dilution with lubricating oils and the like to prepare the final lubricant composition. Such concentrates, which may also contain other additives in desired amounts, and which normally contain at least 10% of the polymer, comprise a convenient method for handling the polymer and may be used as a compounding agent for lubricants in general.

The polymeric additives of this invention can be used with good effect in the case of any one of a wide variety of oils of lubricating viscosity, or of blends of such oils. Thus, the base oil can be a refined Pennsylvania or other paraffin base oil, a refined naphthenic base oil, or a synthetic hydrocarbon or nonhydrocarbon oil of lubricating viscosity. As synthetic oils there can be mentioned akylated waxes and similar alkylated hydrocarbons of relatively high molecular weight, hydrogenated polymers of hydrocarbons, and the condensation products of chlorinated alkyl hydrocarbons with aryl compounds. Other suitable oils are those which are obtained by polymerization of lower molecular weight alkylene oxides such as propylene and/or ethylene oxide. Still other synthetic oils are obtained by etherification and/or esterification of the hydroxy groups in alkylene oxide polymers such as, for example, the acetate of the 2-ethylhexanol-initiated polymer of propylene oxide. Other important classes of synthetic oils include the various esters as, for example, di-(2-ethylhexyl)sebacate, tricresyl phosphate and silicate esters. If desired, the oil can be a mixture of mineral and synthetic oils.

While satisfactory lubricant compositions can be obtained by adding to the base oil employed only one or more of the polymeric additives of the type described above, it also falls within the purview of this invention to provide lubricant compositions which contain not only such polymers, but also other additives such as pour point depressants, oiliness and extreme pressure agents, antioxidants, corrosion inhibiting agents, blooming agents, thickening agents, and/or compounds for enhancing the temperature-viscosity characteristics of the oil. The present invention also contemplates the addition to the lubricant composition (particularly when the amount of copolymer employed is relatively small) of auxiliary detergents and/or antiwear agent.

Illustrative lubricant compositions of the above type containing the copolymeric additives of the invention in combination with other agents may include, for example, from about 0.1 to 10% by weight of alkaline earth metal higher alkylphenate detergent and wear reducing agents such as calcium alkylphenates having an average of approximately 14 carbon atoms in the alkyl group as well as organic thiophosphate corrosion and high temperature oxidation inhibitors such as the reaction product of pinene and $P_2S_5$ and the bivalent metal dihydrocarbyl dithiophosphates, zinc butyl hexyl dithiophosphate and zinc tetradecylphenyl dithiophosphate in amounts of from about 0.1 to 10% by weight of the composition. Temperature-viscosity improving agents which may be employed in the compositions, usually in amounts of from about 1 to 10% by weight, include by way of example the homopolymers of alkyl methacrylates such as the dodecyl methacrylate polymers known to the trade as Acryloid 710 and Acryloid 763, products of Rohm & Haas Company, and high molecular weight butene polymers such as Paratone ENJ 15P, a product of the Enjay Company.

The polymeric additives of the invention as described above are evaluated as detergents in lubricating oils and as dispersants in hydrocarbon liquids in a number of tests. The results of the tests along with a description of the polymeric additives are set out in the following tables.

In the tests as described below the base oil, unless otherwise specified, is a solvent refined wax free 150 neutral mineral lubricating oil. It has a viscosity index of 88 and is derived from California waxy crude. The polymeric additive is employed in the oil in an amount of 2.8% by weight of polymer based on total composition, unless otherwise noted.

In the test where the piston varnish ratings are obtained, a given lubricating oil composition is tested as the crankcase lubricant in a 6-cylinder Chevrolet engine using a low grade gasoline especially prone to cause engine deposits, the conditions being those defined in the standard FL-2 test procedure as described in the June 21, 1948, report of the Coordinating Research Council. This procedure requires the maintenance of a jacket temperature of 95° F. and a crankcase oil temperature of 155° F. at 2500 r.p.m. and 45 brake horsepower of 40 hours, and therefore closely simulates the relatively "cold" engine conditions which are normally experienced in city driving. At the end of each test, the engine is dismantled and the amount of engine deposits on the piston determined and expressed as the piston varnish rating. This value is obtained by visually rating (on a scale of 0 to 10, with 10 representing the absence of any deposit) the amount of deposit on each piston skirt and averaging the individual ratings so obtained for the various pistons. Under the conditions of this test, a piston varnish rating of 3.5 is indicative of detergent performance, though preferably this rating should be 4 or above. In the case of the base oil alone without the addition of any additives it is found that the piston varnish rating is approximately 3.0. On the other hand, as indicated by the data presented in the tables below, when the base oil is compounded with the indicated amounts of a copolymer, greatly superior results are obtained.

The polymeric additives according to the invention are also evaluated for their dispersing properties in the standard carbon peptization test. In this test 0.1 g. of 100% active copolymer is dissolved in 100 ml. of kerosene in a 100 ml. graduated glass cylinder. To this solution of polymer is added 0.5 g. of ordinary lamp black. The contents of the graduated cylinder are mixed by manual shaking using an end-over-end motion for exactly one minute. After the shaking, the cylinder is placed upright and observed periodically about every half hour. The carbon peptization test number (CPT) is expressed as hours required for total settling of the carbon black. A CPT of 4 hours or more indicates significant dispersing properties. The carbon peptization tests are found to correlate well with the FL-2 engine test described above.

In addition to the foregoing tests of detergency and dispersing properties of the polymeric additives data were also obtained in a Caterpillar L-1 test under Supplement I conditions for a period of 120 hours as described in the Coordinating Research Council Handbook, January 1946.

In these tests the PD numbers of oils are obtained to show the piston discoloration rating. Following each engine test the three piston lands are examined visually. A piston land which is completely black is assigned a PD number of 800. The piston lands which are completely clean are assigned a PD number of 0. Intermediate PD numbers are assigned in proportion to the extent and degree of discoloration of the piston lands.

In Table I below the polymers all contain a representative oil-solubilizing (A) monomer consisting of 60% by weight dodecyl methacrylate and 40% by weight of octadecyl methacrylate. The glycidyl component of the (B) monomer in the polymer is glycidyl methacrylate, which is also representative of such components. In the examples of the table a variety of amino compounds are shown which are reacted with the epoxy group of the glycidyl methacrylate. The (C) monomer is exemplified by polyethylene glycol (1800 av. mol. wt.) monododecyl ether methacrylate. The polymers of the examples also are identified by their monomer ratios, as well as by analysis for nitrogen on a percent by weight basis (percent N). The viscosity index of the oils in the examples is also shown in the table as evidence of the important viscosity-temperature characteristics of the lubricant compositions containing polymers according to this invention.

In the examples of the table the performance of the base oil alone, without any polymers whatsoever, is shown as Example No. 3. The copolymer of Example No. 4 contains no amino compound, as indicated in the table.

TABLE I

| Ex. No. | Amino compound of (B) monomer | Molar ratio of monomers | Percent N | V.I. | PD No. (L-1) | PVR (FL-2) | CPT (hours) |
|---|---|---|---|---|---|---|---|
| 3 | | | | 88 | 800, 800, 800 | 3.0 | <1 |
| 4 | None | 35/1/0 | | | 390, 215, 260 | 6.5 | |
| 5 | Dimethyl aminopropylamine | 10/1/1 | 0.84 | 141 | | | |
| 6 | ----do---- | 42/3/1 | 0.50 | | | 7.9 | |
| 7 | N-amino ethylheptadecenyl imidazoline | 50/1/1 | 0.27 | 145 | 50, 0, 0 | 6.7 | |
| 8 | Dimethyl aminopropylamine | 50/1/1 | 0.21 | | 5, 0, 0 | | |
| 9 | ----do---- | 70/1.5/1 | | 143 | | | 22 |
| 10 | N-amino ethylpiperazine | 70/1.5/1 | | 143 | | | 48+ |
| 11 | N-amino ethylethanolamine | 70/1.5/1 | | 143 | | | 48+ |
| 12 | Dimethyl aminopropylamine | 70/1/1 | | 149 | 10, 0, 0 | 8.5 | 48+ |

In Table II below, additional examples are given to show several typical variations of the primary components of the novel amino-alcohol and polyglycol copolymers according to this invention. Different oil-solubilizing monomers are included and the characteristic amino-alcohol groups are incorporated in a variety of forms, such as those derived from olefins and ethers. Here again the (C) monomer is exemplified by polyethylene glycol (1800 av. mol. wt.) monododecyl ether methacrylate. The effectiveness of the copolymers is illustrated by their carbon peptization test number.

Still further examples of various oil-soluble detergent copolymers in accordance with the invention are given in Table II which follows. The copolymers of these examples employ a variety of oil-solubilizing monomers, amino-alcohol monomers and polyglycol monomers in specific combinations.

TABLE II

| Ex. No. | Oil-solubilizing (A) monomer | Alcohol-amino (B) monomer | Molar ratio of monomers | Percent N | CPT (hours) |
|---|---|---|---|---|---|
| 13 | 60% dodecyl methacrylate, 40% octadecyl methacrylate | Butadiene monoxide-tetraethylene pentamine | 30/1/1 | 0.62 | 40+ |
| 14 | ----do---- | Allyl glycidyl ether-diethylene triamine | 30/1/1 | 0.35 | 40+ |
| 15 | Vinyl stearate | Allyl glycidyl ether-N-methyl benzyl amine | 30/1/1 | 0.16 | 52 |
| 16 | Vinyl acetate and didodecyl fumarate (1:1 mole ratio) | Allyl glycidyl ether-tetraethylene pentamine | 22/22/1/1 | 0.52 | 35 |

TABLE III

| Ex. No. | Oil-solubilizing (A) component | Alcohol-amino (B) component | Polyglycol (C) component | Molar ratio of compounds |
|---|---|---|---|---|
| 17 | Dodecyl methacrylate, 1-hexene (40/1 mole ratio). | Glycidyl acrylate-nonaethylene decamine. | Polyethylene glycol (av. mol. wt. 400) monomethacrylate. | 50/1/4 |
| 18 | Vinyl isobutyl ether, dioctyl fumarate (1/1 mole ratio). | Diglycidyl fumarate-aminoethyl morpholine. | Dipolyethylene glycol (av. mol. wt. 350) fumarate. | 30/1/0.5 |
| 19 | Dodecyl acrylate, styrene (70/5 mole ratio). | Butadiene monoxide-m-xylylidene. | Allyl polyethylene glycol (av. mol. wt. 750) ether. | 75/1/2 |
| 20 | Vinyl octanoate, vinyl acetate, diisopropyl fumarate, dihexadecyl fumarate (1/1/1/1 mole ratio). | Allyl glycidylether-pyrrole. | Vinyl poly-1,2-propylene glycol (av. mol. wt. 1200) ether. | 40/1/1 |
| 21 | Allyl butyl ether, didodecyl maleate, vinyl butyrate (2/2/1 mole ratio). | Glycidyl acrylate-aminoethyl ethanolamine. | Polyethylene glycol (av. mol wt. 2400) methacrylamide. | 30/1/0.75 |
| 22 | Stearyl acrylate, butyl acrylate (4/1 mole ratio). | Glycidyl acrylate-p-phenylene diamine. | Allyl polyethylene glycol (av. mol. wt. 1600) amine. | 50/6/1 |
| 23 | Diisopropyl fumarate, dioctadecyl fumarate, vinyl acetate (1/1/2 mole ratio). | Glycidyl methacrylate-dimethyl amino propylamine. | Polyethylene glycol (av. mol. wt. 1600) methacrylate. | 80/3/1 |
| 24 | Octyl methacrylate, octadecyl methacrylate (2/1 mole ratio). | Glycidyl acrylate-tetraethylene pentamine. | Polyethylene glycol (av. mol. wt. 4000) methacrylate, vinyl pyrrolidone (1/10 mole ratio). | 150/8/11 |
| 25 | Dodecyl acrylate. | Glycidyl acrylate-tetraethylene pentamine. | Polyethylene glycol (av. mol. wt. 8000) methacrylate, dimethyl amino propyl methacrylate (1/7 mole ratio). | 95/6/8 |
| 26 | Vinyl 2-ethyl hexyl ether, dioctyl maleate (1/1 mole ratio). | Diglycidyl maleate-polypropylene polyamine, mixture of 1 to 4 propylene amine units. | Dipolyethylene glycol (av. mol. wt. 3000) maleate. | 60/5/1 |

From the tests of the foregoing tables it will be seen that each of the illustrative compositions containing the polymeric lubricating oil additives according to the invention possesses greatly improved lubricating properties compared to the base oils alone, or oils containing other closely related copolymers. The copolymeric additives containing alcohol-amino and polyglycol constituents are remarkably effective detergents and dispersants. Significant benefits are obtained in both low temperature type of engine operation as found in gasoline internal combustion engines and in high temperature type of operation as found in diesel engines. The combination of such low and high temperature detergent and dispersant properties in lubricant compositions containing a single polymeric additive is particularly important. The presence of both desirable properties in a single polymeric additive facilitates the provision of a single lubricating oil composition suitable for use in either gasoline engine lubricating oils or diesel engine lubricating oils.

We claim:

1. A lubricant composition comprising a major portion of an oil of lubricating viscosity and a minor portion sufficient to enhance the detergent characteristics of the composition of an oil-soluble copolymer of (A) at least one alkyl methacrylate having 4 to 30 carbon atoms in the alkyl group, (B) glycidyl methacrylate, the epoxy ring of said glycidyl portion of the polymer being reacted with N-2-aminoethylpiperazine, the molar ratio of the glycidyl portion to diamine being approximately 1:1, and (C) polyethylene glycol monomethacrylate of polyethylene glycols having a molecular weight between about 220 and 30,000 and containing at least 5 ethylene glycol units, said copolymer containing from about 40 to about 96% by weight of hydrocarbon oil-solubilizing groups from said (A) component, from about 0.05 to 8.0% by weight of nitrogen, from about 4 to about 60% by weight of polyglycol groups from the (C) component, and having a total molecular weight of at least about 2,000.

2. As a novel composition an oil-soluble copolymer of (A) at least one alkyl methacrylate having 8 to 30 carbon atoms in the alkyl group, (B) glycidyl methacrylate, and (C) polyethylene glycol monomethacrylate in which the polyethylene glycol has a molecular weight between about 220 and 30,000, the epoxy ring of said glycidyl portion of the polymer being reacted with N-amino ethylpiperazine, the molar ratio of the glycidyl portion of piperazine being approximately 1:1, said copolymer containing from about 40 to about 96% by weight of hydrocarbon oil-solubilizing groups from said (A) component, from about 0.05 to 8.0% by weight of nitrogen, from about 4 to about 60% by weight of polyglycol groups from the (C) component, and having a total molecular weight of at least about 2,000 as determined by the light scattering method and a solubility in mineral lubricating oil of at least 0.5% by weight.

References Cited by the Examiner

UNITED STATES PATENTS

| | | | |
|---|---|---|---|
| 2,582,708 | 1/52 | Lippincott et al. | 252—56 |
| 2,737,496 | 3/56 | Catlin | 252—51.5 |
| 2,761,870 | 9/56 | Payne et al. | 260—348 |
| 2,781,335 | 2/57 | Cupery | 260—86.1 X |
| 2,892,783 | 6/59 | Stuart et al. | 252—42.7 |

DANIEL E. WYMAN, *Primary Examiner.*

JOSEPH R. LIBERMAN, *Examiner.*